Jan. 30, 1951 W. W. HANSEN ET AL 2,539,511
RADAR SYSTEM TEST EQUIPMENT
Filed July 8, 1942 2 Sheets-Sheet 2

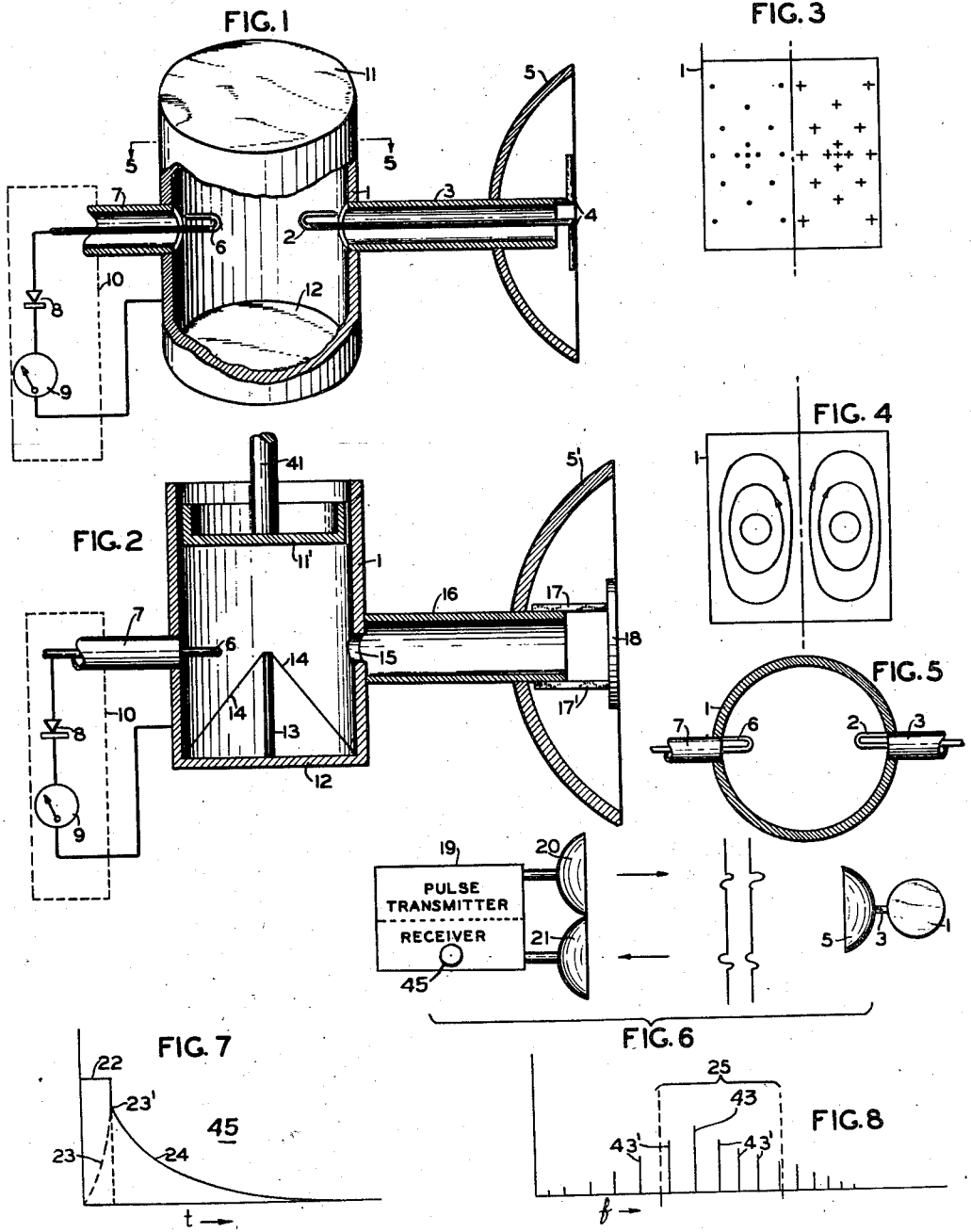

INVENTORS:
W. W. HANSEN
J. R. WOODYARD
BY
ATTORNEY

Patented Jan. 30, 1951

2,539,511

UNITED STATES PATENT OFFICE 2,539,511

RADAR SYSTEM TEST EQUIPMENT

William W. Hansen and John R. Woodyard, Garden City, N. Y., assignors to The Sperry Corporation, a corporation of Delaware Application July 8, 1942, Serial No. 450,226

6 Claims. (Cl. 343—5)

This invention relates, generally, to the art of detection of objects by means of microwave pulse systems, and, more particularly, to novel test devices adapted for the testing and maintenance of such object detection systems. The present invention is especially useful in testing the overall characteristics of such devices.

Forms of the present invention are useful with pulse object detection systems which, in general, comprise a transmitter of sharp ultra-high-frequency pulses of electromagnetic energy, a receiver for reception of returned signals from any reflecting objects located in the radiation pattern of the radiator associated with the transmitter, and indicator means for showing the orientation and distance of the reflecting object or obstacle in space relative to the system. It is usually necessary in these systems to employ a blanking pulse, synchronized with the transmitted pulse and overlapping the latter in time, in order to make the receiver inoperative during periods of transmission. Previous to the present invention it has not been possible to employ a conveniently located standard test object because any reflections from nearby objects occur so nearly instantaneously as to be obscured by the transmitted pulse or suppressed by the receiver blanking pulse. Prior art methods of testing such devices have, therefore, involved the testing of the individual components of the system separately, these tests generally being difficult, inconclusive, and slow. Former methods of testing transmitters have necessitated the use of separate receivers, in order to obtain independent evidence as to the behavior of the transmitter. A similar procedure is necessary in testing receivers, so that no readily useful test procedure has been devised which will test the complete system.

It is seen that it is desirable to provide test equipment which can be used under difficult service conditions and which provides a rapid and conclusive check on the overall characteristics of such pulse systems.

It is, therefore, the principal object of the present invention to provide improved means for testing the characteristics of pulse type object location systems.

Another object lies in the provision of such a test device which will check the overall characteristics of such pulse systems, the test device being compact, readily used, and easily interpretable, and being reasonably broad in its frequency response characteristics, obviating tuning thereof.

Other objects and advantages will become apparent from the specification, taken in connection with the accompanying drawings wherein the invention is embodied in concrete form.

In the drawings,

Fig. 1 is a partial cross-section perspective view of one form of the present invention.

Fig. 2 is a cross-section view of an alternate form of Fig. 1.

Fig. 3 illustrates the electric field existing in the resonators of Figs. 1 and 2.

Fig. 4 illustrates the magnetic field corresponding to the electric field of Fig. 3.

Fig. 5 is a cross-section plan view taken along the line 5—5 of Fig. 1.

Fig. 6 is a schematic representation of the test device in use.

Figs. 7, 8 and 9 are explanatory graphs.

Similar characters of reference are used in all of the above figures to indicate corresponding parts.

Figure 10:
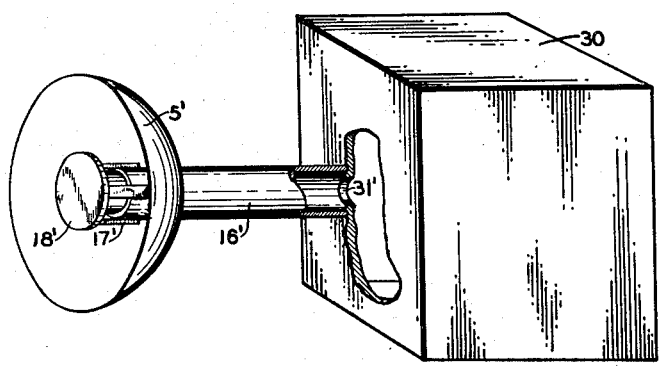
Fig. 10 is a partial cross-section perspective view of one form of the invention.

Referring now to Fig. 1, there is shown a conducting hollow cylindrical resonator 1 of the general type disclosed in copending application Serial No. 422,715, entitled "Resonator Wavemeter," filed December 12, 1941, in the name of William W. Hansen, now Patent No. 2,439,388, granted April 13, 1948. Coupled to the resonator 1 is a conventional loop 2 which terminates a concentric line 3. Concentric line 3 is terminated at its far end by a dipole 4 situated at or near the focus of a parabolic antenna 5. The loop 2 has its plane placed parallel to those of flat ends 11 and 12 of the resonator 1, as is more clearly seen in Fig. 5. As shown in the aforementioned copending application Serial No. 422,715, when the loop 2 is placed in this position the type of electromagnetic field excited within the resonator 1 is that shown in Figs. 3 and 4.

As seen in Fig. 3, the lines of electric force are parallel circular lines concentric to the major axis of the cylinder; and as seen in Fig. 4, the magnetic lines of force generate concentric tori about the axis of symmetry of the cylinder 1.

A coupling loop 6, placed parallel to coupling loop 2, terminates the end of a concentric line 7, to which a crystal or other detector 8 and a direct current meter 9 are joined. Crystal 8 may be surrounded by a shield 10, of well known design, in a conventional manner. The positions of the coupling loops 2 and 6 are shown in the cross-section view of Fig. 5.

In operation, the device shown in Fig. 1 is placed as seen in Fig. 6 at some convenient distance in front of the pulse transmitter-receiver system 19 having a cathode ray range indicator 45. The pulse emitted from the transmitter antenna 20 is received by parabola 5. This pulse is represented in Fig. 7 by the square-top pulse 22. During the duration of the pulse 22 the energy level inside of the resonator 1 is gradually built up to the point 23'. At this point the transmitter sharply cuts off and the energy level in the resonator 1 dies exponentially as shown by the line 24, due to loss of energy by radiation through line 3 and out of parabola 5, this radiation being directed back toward the pulse system receiver antenna.

Thus, the range indicator 45 of pulse system 19 will show on its cathode ray screen an indication which has the general appearace of the solid line 22, 24 of Fig. 7. If a blanking pulse is employed in the receiver to suppress the indication of the transmitted pulse 22, the range indicator 45 will respond only to the re-radiated energy 24.

Referring now to Fig. 2 there is shown an alternate form of the device of Fig. 1. Resonator 1 is now provided with a movable piston end wall 11' attached to a rod 41, so that the resonance frequency of the device may be varied. The position of rod 41 may be calibrated in terms of frequency. On the axis of the resonator 1 is positioned a conducting support rod 13, which is shown supporting two or more diagonally placed resistance wires 14, whose resistances are preferably on the order of 30 ohms. These wires are used to damp out all modes of oscillation occurring in the resonator other than the mode characterized by the electromagnetic field described in Figs. 3 and 4, the wires being so placed as to effect critical damping of any mode of oscillation whose lines of magnetic flux link the wires. The currents induced in the walls of the resonator 1 are of course at right angles to the magnetic field and here run only concentric to the axis of the resonator. Thus no currents flow across the contact between the piston and the cylindrical wall to introduce losses. There is also substantially no radiation loss through the crack between the piston and the resonator because the electric field is parallel to this gap.

Energy is introduced into and radiated from resonator 1 by an antenna structure consisting of an orifice 15 in the cylindrical wall of resonator 1, a wave guide 16, a reflector disc 18 supported by dielectric supports 17, 17', and a parabolic reflector 5'. The wave guide 16 is made large enough in diameter to transmit the desired maximum frequencies and the diameter of orifice 15 is made small enough to not spoil the Q of resonator 1 and yet large enough so that a suitable amount of energy will be admitted to the resonator 1 during the time length of the transmitter pulse 22. The energy level measuring elements 6 to 10 are similar to those of Fig. 1.

The device shown in Fig. 2 will reflect from the antenna structure or absorb in the resistance wires 14 all but one transmitted frequency if its resonance characteristic is sufficiently narrow. Transmitter output energy of frequency substantially equal to the resonant frequency is stored in the electromagnetic field within the resonator and is reradiated over a period long compared to the exciting pulse. As seen in Fig. 8, the energy radiated by pulse type transmitters consists of a fundamental or carrier frequency component 43 and many side band component 43' of lesser intensity. The device may then be used, in conjunction with detector 8 and meter 9, to measure the fundamental output frequency of the pulse system, as the carrier frequency components 43 is of greater amplitude than the side band components 43'. Thus, if the carrier frequency 43 is not positioned at the maximum position on the response curve of the receiver, the receiver or the transmitter itself may be accordingly adjusted.

It is seen that the device of Fig. 2 reradiates only one frequency, which may be useful for particular purposes, whereas the device of Fig. 1 may resonate at several frequencies because of the fact that it is possible to excite several modes of oscillation in such a resonator. Thus, one may not know exactly which mode is excited in the resonator of Fig. 1. The device of Fig. 2 is therefore useful where it is desired to calibrate the device in terms of wavelength. Where a large number of reradiated frequencies are desirable, the type of device shown in Figs. 10 and 11 may be preferred.

Referring to Fig. 10 there is shown a large rectangular conducting box 30 coupled through an orifice 31 to a wave guide 16' which cooperates with reflector disc 18' and parabolic reflector 5' to form an antenna system similar to that of Fig. 2. The box 30 need not be rectangular but may be of any odd shape which is preferably one which will avoid degeneracy in the energy levels of the electromagnetic modes of oscillation excitable inside of the box. The box is preferably stiffened by suitable braces in order to avoid microphonics due to vibration. If desired the box 30 may be covered with vibration deadening material and placed in a larger container. A dielectric plug in the wave guide 16' may be employed to provide further protection against acoustic vibrations. It is to be understood that these precautions may be used with any form of the invention.

Figure 11:
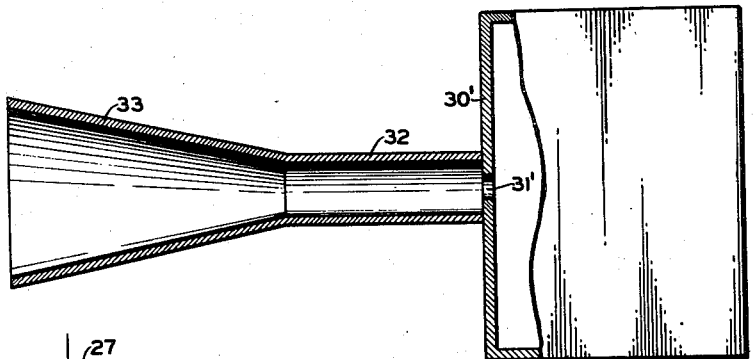
Fig. 11 is a cross-section view of an alternate form of the device shown in Fig. 10.

As seen in Fig. 11, the radiator may well be an electromagnetic horn 33, or it may be the type of antenna shown in Fig. 1. If desired, the concentric line 3 or wave guides 16, 16' or 32 may be made of considerable length and flexible in order that the resonance chamber may be left in one position and to enable the operator to carry the antenna to the proper position in front of the pulse system to be examined.

If the box 30 is made rectangular, its three dimensions are preferably made incommensurate, and for wavelengths of about 10 centimeters may be on the order of 60 centimeters or larger. In general, the box is preferably made large enough and so dimensioned that many modes of oscillation may exist within the waveband used by the object locator. For example, the possible modes may lie within the dashed lines 25 shown in Fig. 8. By making the dimensions of the box 30 in the order of 60 centimeters or larger and operating the box in the region of wavelengths in the order of 10 centimeters the echo box is able to support a plurality of modes within the operating range of the system being tested. The farther removed the operating wavelength is from the natural resonant wavelength of the echo box the greater the number of modes which may be excited in a given wavelength band.

In order to separate in frequency the many possible modes which are capable of being excited in a given operating range, it is helpful to make the three dimensions of a rectangular box incommensurate. This reduces the possibility of higher order multimode degeneracy and thus greatly increases the number of discrete frequencies at which the echo box may resonate and reradiate. When many frequencies are reradiated toward the pulse system receiver, the range indicator 45 of the receiver will give an indication similar to that illustrated in Fig. 9. There will be the relatively long time decay period corresponding to line 24 of Fig. 7. In addition, there will be a more or less periodic low frequency oscillation, as at 28, due to the spacing between the states existing inside of the box, i. e., this frequency will be related to box size, the relative amplitudes of the states depending upon the Q of the box for each individual mode. There will also be very high frequency oscillations, as at 29, which are characteristic of the band width of the entire system including the transmitter as well as the receiver. For instance, if the transmitter is emitting too wide a frequency band, the frequency of oscillation 29 will increase.

In general, it is seen that the devices of the present invention provide a simulated reflecting object, so that the behavior of the receiver may be examined on the range indicator at some point removed in time from the transmitter pulse. A further use of the present invention is in aligning the mechanical and electrical axes of pulse systems employing servo systems which either position the system itself or guns or other devices with respect to a chosen target or other reflecting obstacle.

Figure 12:
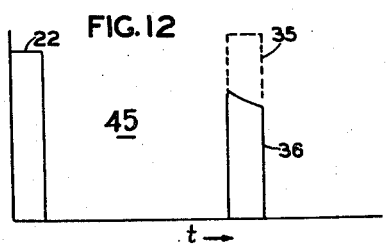
Fig. 12 is an explanatory graph.

Pulse type target detection systems generally have attached to their range indicators a rangegate which can be caused either manually or automatically to follow a chosen reflecting object in range as the distance between the transmitter and reflecting object changes due to motion of the reflecting object. This gate is represented by the dotted line 35 of Fig. 12, and causes the receiver to be inoperative at all other points in the range scale. Thus, if the range gate is arbitrarily set at some position, as at 35, the range indicator 45 will show only a small portion of the decay curves of Figs. 7 and 9, as at 36 in Fig. 12. Proper alignment of the system, proper tuning of the receiver or transmitter, and other adjustments will all tend to maximize the height of pulse 36.

Figure 9:
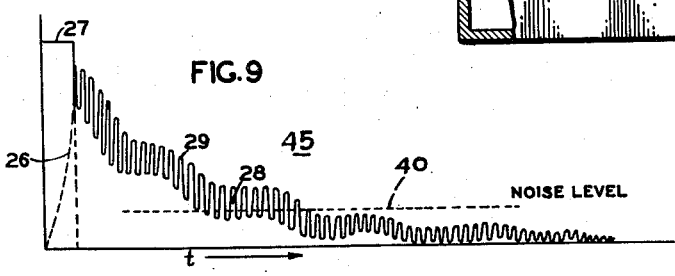

The relative sensitivity of a system can be determined by observing the time interval on the range indicator 45 between the transmitted pulse 27 and the point at which the decay curve of Fig. 9 reaches the noise level 40.

Many other characteristics of portions or of the whole of a pulse system may be investigated by means of the present invention.

As many changes could be made in the above construction and many apparently different embodiments of this invention could be made without departing from the scope thereof, it is intended that all matter contained in the above description or shown in the accompanying drawings shall be interpreted as illustrative and not in a limiting sense.

What is claimed is:

1. An object detecting system comprising a pulse wave transmitter, a receiver for said pulse wave adjacent said transmitter, and a cavity resonator having a plurality of modes of oscillation in the operating frequency range of said transmitter and adapted to be excited by said pulse wave and for actuating said receiver from the excitation of said resonator, said resonator being in the form of a rectangular parallelepiped having incommensurate wall dimensions.

2. Microwave radar energy reception and retransmission apparatus comprising a hollow metallic box having a plurality of rectangular walls, said box having incommensurate internal length, width and depth dimensions, the minimum one of said dimensions being many times greater than the radar energy wavelength, and means for introducing radar energy into said box and for extracting energy therefrom for actuation of radar receiving equipment.

3. Microwave radar energy reception and retransmission apparatus as defined in claim 2, wherein said means for introducing radar energy and for extracting energy includes a wave guide having an end communicating with the interior of said box, an aperture of lesser area than the internal cross-sectional area of said wave guide being provided in said box at the juncture of said wave guide therewith.

4. Microwave radar energy reception and retransmission apparatus comprising a hollow metallic box including a plurality of polygonal sides, each of said polygonal sides having incommensurate length and breadth dimensions each many times greater than the wavelength of the radar energy, and means for accepting energy from the radar transmitter and conveying said energy to the interior of said box and for reconveying energy therefrom for energization of the radar receiver.

5. Microwave radar energy reception and retransmission apparatus as defined in claim 4, wherein said means for accepting energy from the radar transmitter and conveying said energy to the interior of said box and for reconveying energy therefrom comprises a wave guide having one end connected to said box, an aperture of lesser area than the internal cross-sectional area of said wave guide being provided in said box at the juncture of said wave guide therewith.

6. Microwave radar energy reception and retransmission apparatus as defined in claim 4, wherein said means for accepting energy from the radar transmitter and conveying said energy to the interior of said box and for reconveying energy therefrom comprises a directive antenna, and means including an aperture in said box for communicating microwave energy between the interior of said box and said directive antenna.

WILLIAM W. HANSEN.
JOHN R. WOODYARD.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,253,589 | Southworth | Aug. 26, 1941 |
| 2,460,827 | Isely | Feb. 8, 1949 |

FOREIGN PATENTS

| Number | Country | Date |
|---|---|---|
| 507,473 | Great Britain | June 14, 1939 |